US008587639B2

(12) United States Patent
Matthews

(10) Patent No.: US 8,587,639 B2
(45) Date of Patent: Nov. 19, 2013

(54) METHOD OF IMPROVED THREE DIMENSIONAL DISPLAY TECHNIQUE

(75) Inventor: Kim N. Matthews, Watchung, NJ (US)

(73) Assignee: Alcatel Lucent, Paris (FR)

( * ) Notice: Subject to any disclaimer, the term of this patent is extended or adjusted under 35 U.S.C. 154(b) by 1346 days.

(21) Appl. No.: 12/316,277

(22) Filed: Dec. 11, 2008

(65) Prior Publication Data
US 2010/0149317 A1 Jun. 17, 2010

(51) Int. Cl.
H04N 13/04 (2006.01)

(52) U.S. Cl.
USPC .................................................. 348/51

(58) Field of Classification Search
None
See application file for complete search history.

(56) References Cited

U.S. PATENT DOCUMENTS

| | | | | |
|---|---|---|---|---|
| 5,038,216 A * | 8/1991 | Easterly et al. | ............... | 348/364 |
| 5,757,520 A * | 5/1998 | Takashima | ............... | 358/513 |
| 5,822,117 A * | 10/1998 | Kleinberger et al. | ......... | 359/465 |
| 5,825,541 A | 10/1998 | Imai | | |
| 5,936,607 A * | 8/1999 | Allio | ........................ | 313/371 |
| 5,966,505 A * | 10/1999 | Igarashi et al. | ................ | 358/1.9 |
| 6,014,193 A * | 1/2000 | Taira et al. | ................... | 349/73 |
| 6,094,216 A * | 7/2000 | Taniguchi et al. | ............. | 348/51 |
| 6,172,807 B1 * | 1/2001 | Akamatsu | ................... | 359/462 |
| 6,327,008 B1 * | 12/2001 | Fujiyoshi | ..................... | 349/106 |
| 6,356,278 B1 * | 3/2002 | Stamm et al. | ................. | 345/611 |
| 6,445,406 B1 * | 9/2002 | Taniguchi et al. | ............. | 348/51 |
| 6,753,858 B2 * | 6/2004 | Asai et al. | ..................... | 345/419 |
| 6,829,019 B2 * | 12/2004 | Van Den Brink et al. | .... | 348/812 |
| 7,027,091 B1 * | 4/2006 | Reyneri et al. | ................ | 348/280 |
| 7,154,653 B2 * | 12/2006 | Kean et al. | ..................... | 359/232 |
| 7,190,518 B1 | 3/2007 | Kleinberger et al. | | |
| 7,397,484 B2 * | 7/2008 | Chang et al. | ................... | 345/690 |
| 7,403,180 B1 * | 7/2008 | Silverstein et al. | ............. | 345/84 |
| 7,705,935 B2 * | 4/2010 | Gaudreau | ....................... | 349/96 |
| 7,764,255 B2 * | 7/2010 | Yen et al. | ....................... | 345/88 |
| 7,808,591 B2 * | 10/2010 | Karman et al. | ................ | 349/116 |
| 7,903,139 B2 * | 3/2011 | Cornejo | ........................ | 348/46 |
| 7,952,156 B2 * | 5/2011 | Mitsui et al. | ................... | 257/435 |
| 7,995,855 B2 * | 8/2011 | Albu et al. | ..................... | 382/260 |
| 8,018,482 B2 * | 9/2011 | Kim et al. | ....................... | 348/42 |
| 8,038,316 B2 * | 10/2011 | Silverstein et al. | ........... | 362/231 |
| 8,130,272 B2 * | 3/2012 | Pastoor et al. | ................. | 348/169 |

(Continued)

FOREIGN PATENT DOCUMENTS

| | | |
|---|---|---|
| WO | 2004/008226 A1 | 1/2004 |
| WO | 2005/106563 A2 | 11/2005 |
| WO | 2006/034192 A2 | 3/2006 |
| WO | PCT/US2009/064101 | 2/2010 |

OTHER PUBLICATIONS

Peterka T et al: "Advances in the Dynallax Solid-State Dynamic Parallax Barrier Autostereoscopic Visualization Display System" IEEE Transactions on Visualization and Computer Graphics, IEEE Service Center, Los Alamitos, CA, US, vol. 13, No. 3, May 1, 2008, pp. 487-499, XP011202645 ISSN: 1077-2626, abstract; figures 8-11, 16, p. 489-p. 490, p. 495-p. 497.

(Continued)

Primary Examiner — Jerry Dennison
(74) Attorney, Agent, or Firm — C. Bilicska

(57) ABSTRACT

A method of displaying an image. The method includes aligning a first display relative to a second display. The first and second displays having a differing encoding patterns. The method also includes determining a location in relation between the displays and activating pixels on the displays based on the determined location.

19 Claims, 6 Drawing Sheets

(56) References Cited

U.S. PATENT DOCUMENTS

| | | | |
|---|---|---|---|
| 8,179,424 B2* | 5/2012 | Moller | 348/46 |
| 8,228,375 B2* | 7/2012 | Liu | 348/51 |
| 2002/0005848 A1* | 1/2002 | Asai et al. | 345/419 |
| 2002/0113866 A1* | 8/2002 | Taniguchi et al. | 348/51 |
| 2002/0196203 A1* | 12/2002 | Krijn et al. | 345/22 |
| 2003/0234980 A1* | 12/2003 | Montgomery et al. | 359/462 |
| 2004/0233230 A1* | 11/2004 | Hancock | 345/690 |
| 2005/0012755 A1* | 1/2005 | Dresevic et al. | 345/581 |
| 2005/0117082 A1* | 6/2005 | Tanaka et al. | 349/44 |
| 2005/0264904 A1* | 12/2005 | Sato et al. | 359/885 |
| 2005/0285962 A1* | 12/2005 | Cornejo | 348/333.01 |
| 2006/0050384 A1* | 3/2006 | Agostinelli | 359/462 |
| 2006/0082603 A1* | 4/2006 | Shimada | 345/690 |
| 2007/0216687 A1* | 9/2007 | Kaasila et al. | 345/441 |
| 2008/0002083 A1* | 1/2008 | Kwon et al. | 349/43 |
| 2008/0024598 A1* | 1/2008 | Perlin et al. | 348/55 |
| 2008/0036696 A1* | 2/2008 | Slavenburg et al. | 345/8 |
| 2008/0043840 A1* | 2/2008 | Song | 375/240.11 |
| 2008/0246897 A1* | 10/2008 | Gaudreau | 349/15 |
| 2008/0259247 A1* | 10/2008 | Stuart et al. | 349/64 |
| 2008/0303919 A1* | 12/2008 | Egawa | 348/223.1 |
| 2009/0021534 A1* | 1/2009 | Tomizawa et al. | 345/690 |
| 2009/0085029 A1* | 4/2009 | Mitsui et al. | 257/40 |
| 2009/0278936 A1* | 11/2009 | Pastoor et al. | 348/169 |
| 2009/0282429 A1* | 11/2009 | Olsson et al. | 725/10 |
| 2009/0290079 A1* | 11/2009 | Evans et al. | 349/18 |
| 2010/0149317 A1* | 6/2010 | Matthews | 348/51 |
| 2010/0165077 A1* | 7/2010 | Yin et al. | 348/42 |
| 2010/0208100 A9* | 8/2010 | Olsen et al. | 348/227.1 |
| 2010/0295928 A1* | 11/2010 | De La Barre et al. | 348/51 |
| 2011/0248976 A1* | 10/2011 | Isobe et al. | 345/208 |

OTHER PUBLICATIONS

Tom Peterka, et.al.,—"Advances in the Dynallax Solid-Stae Dynamic Parallax Barrier Autostereoscopic Visualization Display System", IEEE Transactions on Visualization and Computer Graphics, Manuscript ID, [Jul. 15, 2207] [pp. 1-13].

Thomas Peterka—"Dynallax: Dynamic Parallax Barrier Autostereoscopic Display", PH.D. Dissetation Graduate College of the University of Illinois at Chicago, 2007—134 pages.

Robert L. Kooima, et. al—"A GPU Sub-Pixel Algorithm for Autostereoscopic Virtual Reality", Electronic Visualization Laboratory, University of Illinois at Chicago, California Institute for Telecommunications and Information Technology, University of California at San Diego, Mar. 2007, 7 pages.

Tom Peterka, et. al—"Advances in the Dynallax Solid-State Dynamic Parallax Barrier Autostereoscopic Visualization Display System", IEEE Transactions on Visualization and Computer Graphics, Manuscript ID, [Jul. 15, 2007] [pp. 1-13].

* cited by examiner

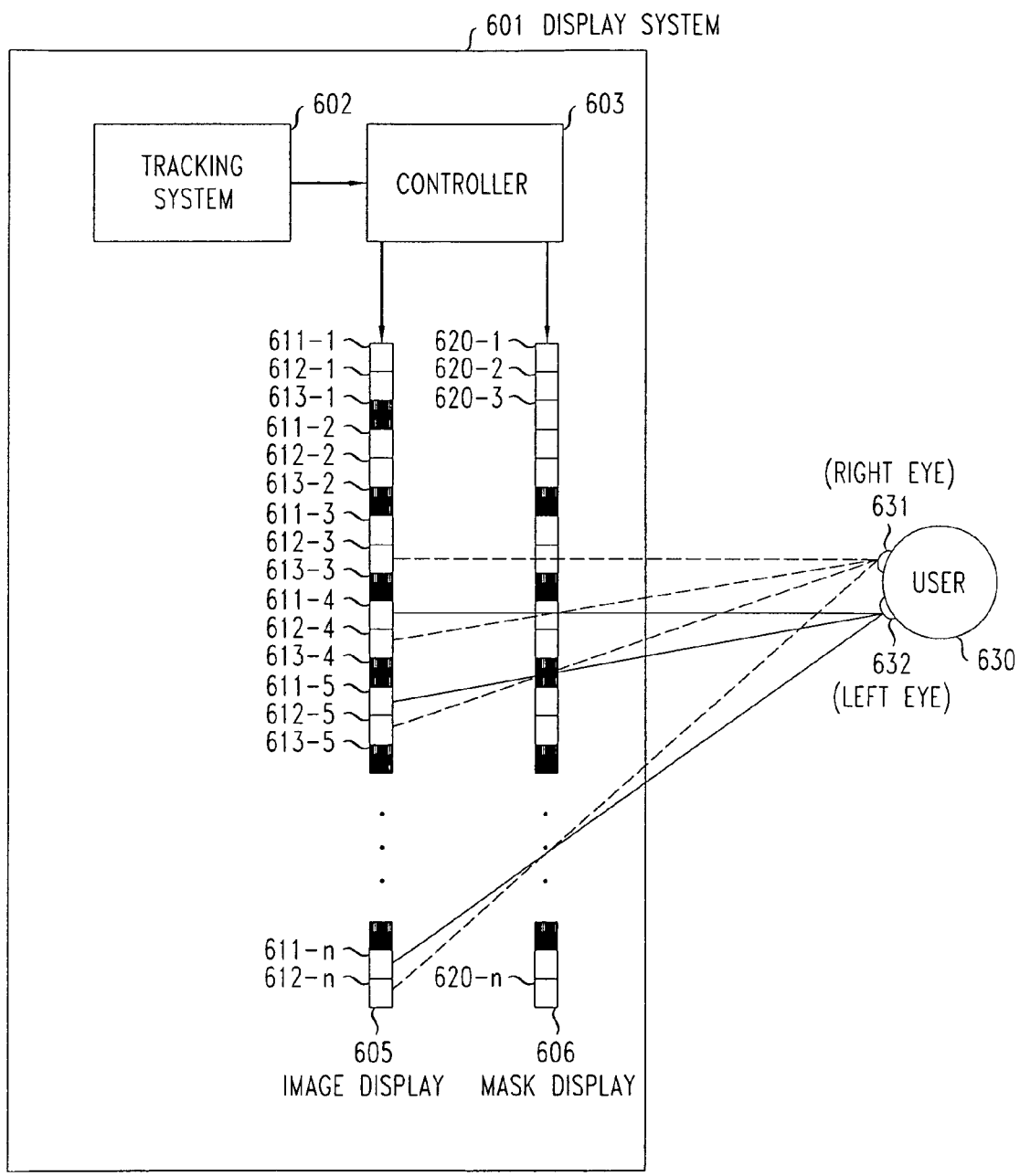

METHOD OF IMPROVED THREE DIMENSIONAL DISPLAY TECHNIQUE

FIELD OF THE INVENTION

The present invention relates to displays, generally, and more particularly, to the display of three dimensional images.

BACKGROUND OF THE INVENTION

Many systems utilize displays to present information in the form of images, video and/or text to users. Displays effectively transmit information, but are constrained by being two dimensional in nature. Human ocular capabilities, however, afford the perception of images in three dimensions. Three dimensional ("3D") technologies are designed to address these ocular capabilities. Providing more realistic 3D performance is especially important in activities such as viewing videos, interactive games, as well as computer animation and design. Creating a 3D display can involve delivering different view-point images to each of the user's eyes. The solutions for delivering different viewpoints can be classified as either stereoscopic 3D displays, holographic 3D displays, or autostereoscopic 3D displays.

Stereoscopy displays present slightly different images to each eye, resulting in the perception of a 3D image. Stereoscopic 3D display solutions typically involve the user wearing active equipment (e.g. headwear). The headwear may comprise: separate displays in front of each eye or shutters, which synchronize the delivery of each eyes' viewpoint with the display. Alternatively, passive eyewear, such as polarized glasses or colored filters, can be worn. Each of these solutions may necessitate the user to purchase, wear and have available specially designed headwear. Further, each solution may require specially encoding the information to interact with the specially designed headwear.

Holographic 3D displays reproduce a light field identical to that which emanated from the original scene. These displays optically store, retrieve and process information. Holographic 3D displays may not require specially designed headwear, but they may require specialized hardware such as spinning mirrors covered with special holographic diffusers and high speed projectors and require a complex Digital Visual Interface (DVI). These components may require very high data-rates and may add exorbitant expense.

Autostereoscopic 3D displays typically use solutions similar to stereoscopic 3D displays, but may not require specially designed glasses or other headwear. For example, parallax barrier displays use two separated layers. On the first layer, a combination of the left and right eye views are arranged. While a second layer, consisting of opaque and transparent barriers, for example, may restrict the light of each viewpoint arriving at the opposite eye. The positioning of the first and second layer creates "viewing diamonds" which limit the user to specific positions where images can be perceived in three dimensions. When a user positions his head in these "viewing diamonds," each eye is delivered a different image, creating the perception of a 3D image.

These known schemes for creating an autostereoscopic 3D display have a number of shortcomings. Firstly, because of the fixed configurations of parallax barrier displays, viewing may be constrained to pre-defined "viewing diamonds." Offset viewing using head detection to either adjust the barrier sideways or change the separation of the display/mask may be used to dynamically adjust the "viewing diamonds," however, if the user's head is tilted or twisted relative to the display, or the user's eyes are effectively at different distances from the display causing distortion in the upper and lower bounds of the image. To compensate for these off-angle corrections, a parallax barrier system may necessitate a complex barrier/display configuration. Secondly, because of the finite viewing distance, the apparent distance between pixels in the display and the barrier caused by their separation may result in the display and barrier moving in and out of phase relative to each other across the display plane. This phase shift appears as very large dark bands, (i.e. "banding"), running vertically down the image and becoming more pronounced as the viewing angle of the display increases.

Therefore, a need exists for an autostereoscopic display that maximizes a user's available positions.

SUMMARY OF THE INVENTION

The present invention provides a method of displaying multidimensional images. More particularly, the present invention offers a method of displaying images. For the purposes of the present invention, a display tracks the location of a user and dynamically generates a display view and barrier mask pattern to effectuate multidimensional viewing.

In a first embodiment, the present invention provides for a method of displaying images in a display system. The method may include aligning at least two displays in a display system. Here, a second display may mask the image presented on a first display. Thereafter, the displays may be controlled based on view location to deliver multidimensional images.

In another embodiment, the present invention provides for an autostereoscopic image display. The invention may comprise a plurality of displays, a tracking system, and a control module. Here, the control module may use inputs from the tracking devices to determine user location. Thereafter, the control module may control the displays based on the user location to deliver multidimensional images.

BRIEF DESCRIPTION OF THE DRAWINGS

The present invention will be better understood from reading the following description of non-limiting embodiments, with reference to the attached drawings, wherein below:

FIG. 6 depicts still another aspect of the present invention;

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Considerable research efforts have been devoted to enhancing content delivery using display technologies. To effectively present 3D images, a method which allows freedom of user movement may be desired. Consequently, a need exists for an autostereoscopic solution which allows for the increase of available user positions.

The present invention provides a method of displaying multidimensional images. More particularly, the present invention offers a method of displaying images. For the purposes of the present invention, a display may track the location of a user and dynamically generates a display view and barrier mask pattern to effectuate multidimensional viewing.

In another embodiment, the present invention provides for an autostereoscopic image display. The invention comprises a plurality of displays, a tracking system, and a control module. Here, the control module uses inputs from the tracking devices to determine user location. Thereafter, the control module controls the displays based on the user location to deliver multidimensional images.

Figure 1:
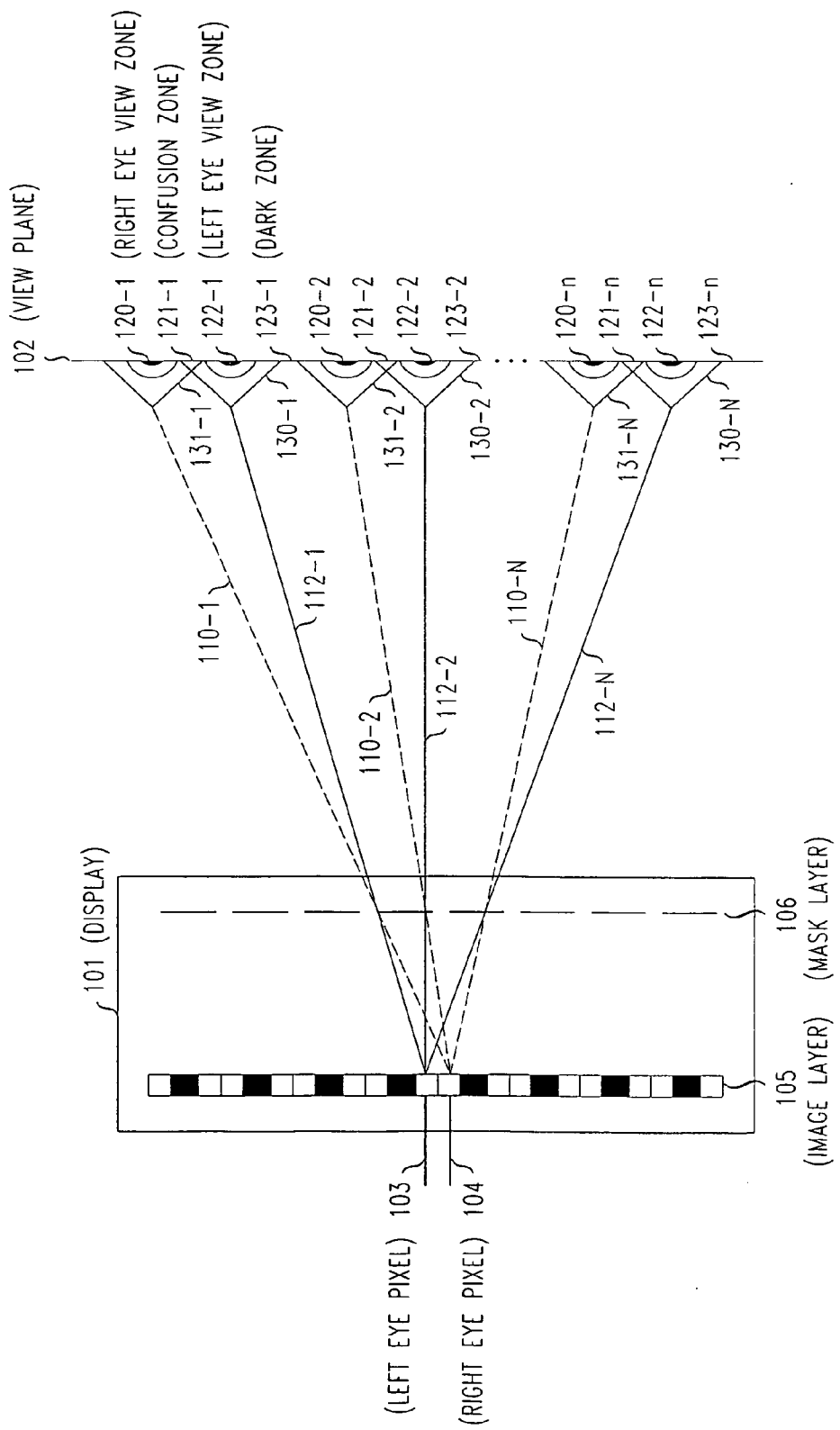
FIG. 1 depicts autostereoscopic delivery of 3D images.

Referring to FIG. 1, viewing position constraints posed by delivering differing images to the left eye 130-1 through 130-n and right eye 131-1 through 131-n of the user are illustrated. Here, a user may perceive an image in 3D when the left and right eyes of the user are positioned in locations 130-1/131-1 through 130-n/131-n. Pixels 103 and 104 are mapped onto the display layer 105 and obscured through a mask layer 106 which directs pixel 103 to the left eye viewing zones 122-1 through 122-n via paths 112-1 through 112-n and pixel 104 to the right eye viewing zones 120-1 through 120-n via paths 110-1 through 110-n. Left eye viewing zones 122-1 through 122-n and right eye viewing zones 120-1 through 120-n are restricted in that the zones are separated by 'double image' or 'confusion' zones 121-1 through 121-n and dark zones 123-1 through 123-n. A lateral displacement of the user's head brings the user's eyes out of the viewing zones 120-1/122-1 through 120-n/122-n, causing a loss of 3D perception, distorted images and banding. Banding is the interposition of dark bands in the user's perception of the image.

Figure 2:
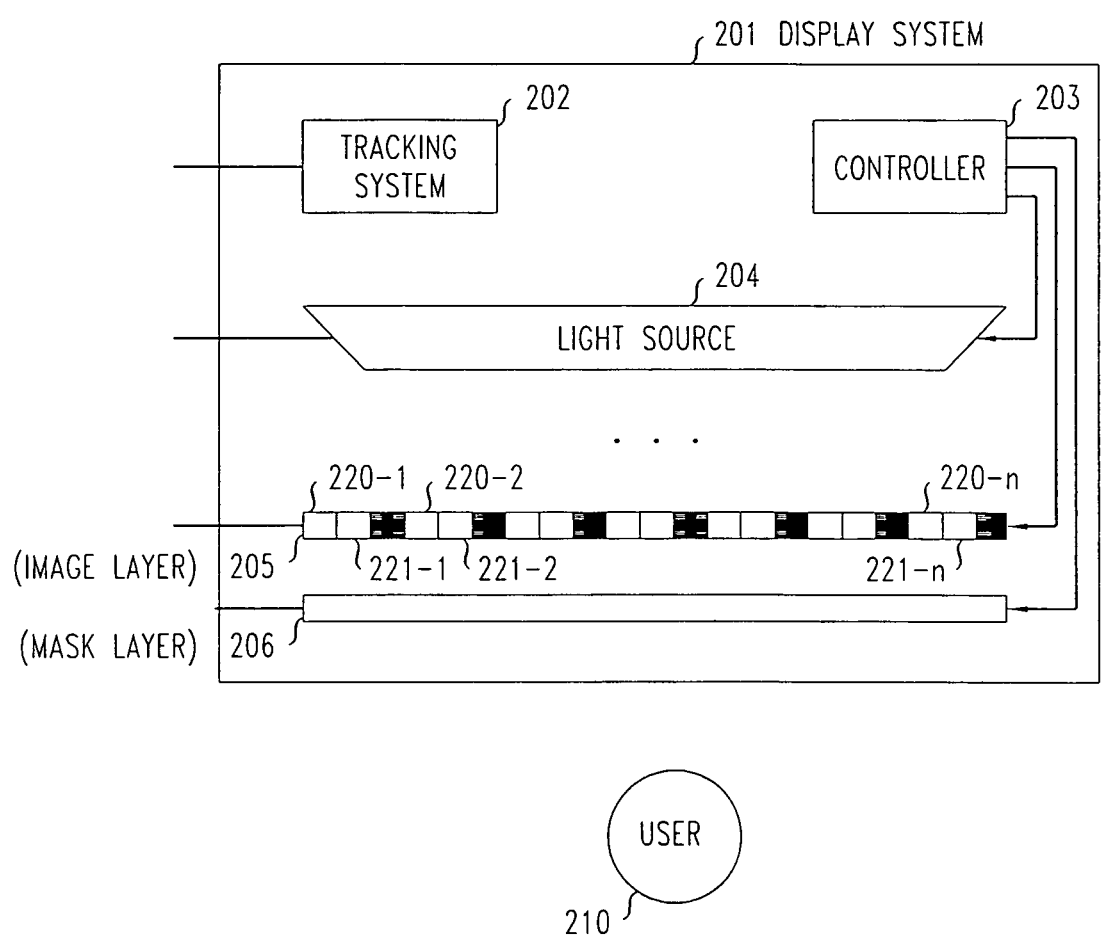
FIG. 2 depicts an aspect of the present invention.

Referring to FIG. 2, an embodiment of the present invention is depicted. Here, a 3D display system 201 which compensates for dynamic user positions is illustrated. 3D display system 201 includes at least two liquid crystal display ("LCD") panels 205 and 206. A first panel 205, referred to as an image layer, may be used to display the left image 220-1 through 220-n and right image 221-1 through 221-n that will be presented to user 210. A second panel 206, referred to as the mask layer, is positioned either in front of or behind the image layer 205 to form a controllable illumination barrier, or mask. The mask layer 206 directs the proper left and right images to user 210. Panels 205 and 206 are positioned to allow polarized light from a light source 204 to pass through to user 210. A tracking system 202, as described in greater detail herein, provides the location of user 210 to controller 203 for adjusting the image on display 205 and mask on display 206. Thus, display system 201 is enabled to provide proper left image 220-1 through 220-n and right image 221-1 through 221-n to user 210, enabling user 210 to perceive a 3D image.

Those skilled in the art may readily recognize that displays 205 and 206 need not be the same type of device and that other display devices such as plasma display, digital light processing ("DLP"), surface-conduction electron-emitter display ("SED"), light-emitting diode ("LED"), organic light-emitting diode ("OLED") or field emission display ("FED"), for example, may be used as substitutes. Additionally, those skilled in the art may readily recognize that displays system 201 need not be limited to merely two displays 205 and 206.

Moreover, as illustrated in FIG. 1, banding occurs when a user's eyes are not positioned properly in left eye viewing zones 122-1 through 122-n and right eye viewing zones 120-1 through 120-n. A number factors influence the degree of banding therefore, alignment solutions are posed herein that mitigate the affects of banding.

Figure 3:
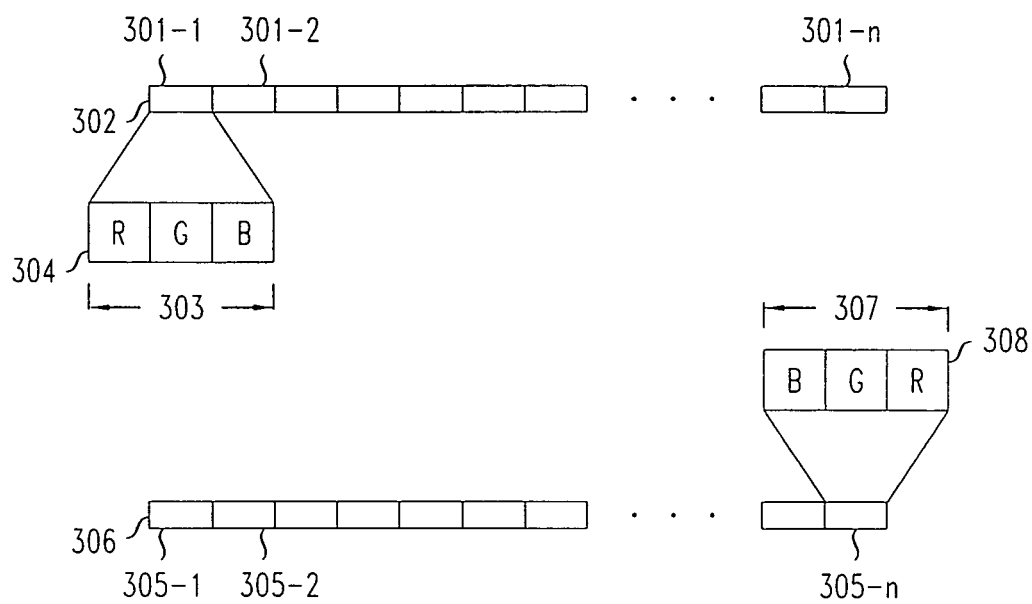
FIG. 3 depicts another aspect of the present invention.

Referring to FIG. 3, an embodiment of the present invention detailing display alignment and alignment considerations of two displays is illustrated. Each of the pixels 301-1 through 301-n in display 302 may have a spatial resolution 303 and color encoding pattern 304. Spatial resolution refers to the unit length of each independent pixel and color encoding pattern refers to the sequence of colors comprising the coloration for a pixel. Similarly, each of the pixels 305-1 through 305-n in display 306 may have a spatial resolution 307 and color encoding pattern 308.

It has been observed that banding is mitigated by differing the spatial resolution 303 between pixels 301-1 through 301-n of display 302 and the spatial resolution 307 of pixels 305-1 through 305-n of display 306 while balancing the required image resolution. Differing the spatial resolution of displays 302 and 306 reduces the width of each band by increasing the apparent spatial frequency of the banding. The reduction of each band's width improves the apparent resolution.

Additionally, these bands can be further reduced by inverting, or flipping, the color encoding pattern 304 of pixels 301-1 through 301-n of display 302 with the color encoding pattern 308 of pixels 305-1 through 305-n of display 306. This configuration results in the pixel color encoding patterns of displays 302 and 306 appearing in the opposite order (e.g. RGB for display 302 and BGR for display 306). The final visible effect is for the exemplary red, green and blue bands to appear at different positions across the display, thereby, reducing their visibility.

Figure 4:
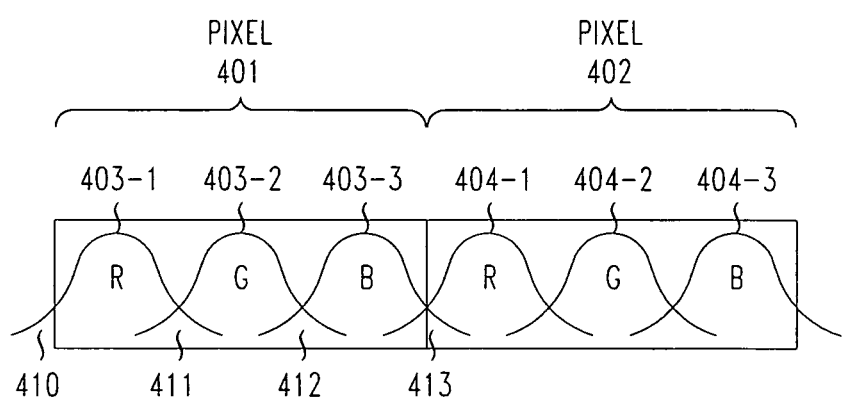
FIG. 4 depicts yet another aspect of the present invention.

Referring to FIG. 4, color crosstalk, or aliasing, between adjacent pixels 401 and 402 is illustrated. Pixel 401 may represent a perceived color by varying the levels of opaqueness of red, green and blue color filters 403-1 through 403-3. Color filters 403-1 through 403-3 of pixel 401 contain overlapping bands 410 through 413. Color crosstalk from overlap bands 411 and 412 may not pose a problem since the crosstalk may be constrained within pixel 401. However, since adjacent pixels 401 and 402 may be delivered to different eyes of a user, overlap 413 between adjacent pixels 401 and 402 may cause distortion if pixels 401 and 402 have not activated the same color filters 403-1 through 403-3 and 404-1 through 404-3 respectively.

Referring back to FIG. 2, improved displays 205 and 206 may incorporate solutions that mitigate the color crosstalk between adjacent pixels. For instance, a high intensity light source 204 such as a laser source or LED can be used to reduce band overlap. Alternatively, band overlap can be addressed by using a stroboscopic light source 204 in place of a continuous source 204. By incorporating an actuator to move displays 205 and 206 by a small distance relative to each other, for example, approximately ~0.25 mm, and synchronizing both the illumination flashes 204 and displays 205 and 206, left and right images can be alternated. Therefore, allowing display 205 to avoid concurrent display of left and right images in adjacent pixels may mitigate crosstalk. Additionally, the use of a stroboscopic light 204 allows the doubling of the apparent spatial resolution of display system 201.

Those skilled in the art may readily recognize that none of the improvements are required to be incorporated to achieve the advantage of the invention and that other techniques for improving the display system 201 are possible. For instance, color encoding patterns other than RGB may be used, temporal color synthesis may be used to provide pixel coloration, or filters, e.g. holographic mirrors or optical filters, could be used to reduce the color crosstalk by creating a band pass filter which notches out points between light sources.

Figure 5:
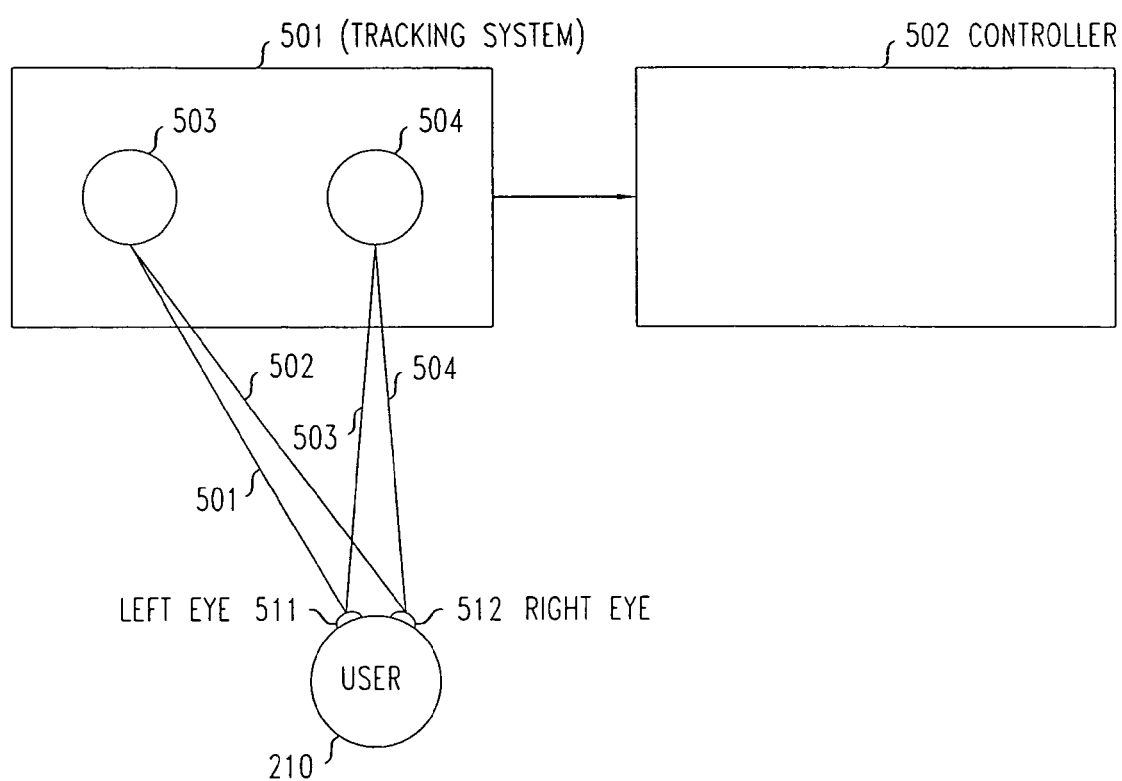
FIG. 5 depicts still another aspect of the present invention.

Referring to FIG. 5, tracking system 501 (also referred herein as means for tracking) for tracking user 510 is illustrated. Tracking devices 503 and 504 compute the location of the left eye 511 and right eye 512 of user 510 by triangulation measurements 503 through 506 and provide eye locations 511 and 512 to controller 502. Tracking devices 503 and 504 may include two tracking devices 503 and 504 with face tracking software which can accurately locate left eye 511 and right eye 512 of user 510. Those skilled in the art may readily recognize that tracking devices 503 and 504 may not be the same type of device and that other devices such as Infrared (IR) Range Sensors or eye tracking devices may be used.

Those skilled in the art may further recognize that locations may be tracked by inputting location information into the display system via external tracking devices which are not a part of the display system as the means of tracking is not important, but rather the provided location information. Finally, those skilled in the art will readily recognize that tracking locations need not be limited to a user's eyes. For instance, head tracking systems could be utilized and the location of the eyes may be calculated via software.

Referring to FIG. 6, display system 601 (also referred herein as means for selectively activating pixels) illustrates an embodiment of the present invention detailing control of displays 605 and 606. Controller 603 may be software run by a processor within the display system 601, which controls displays 605 and 606 based on input from tracking system 602. By using knowledge of the position of user 630 provided by tracking system 602 and the geometry of displays 605 and 606, controller 602 determines the image on display 605 and the mask on display 606. For example, controller 603 determines the image on display 605 by selectively activating pixels 611-1 through 611-n and pixels 612-1 through 612-n and creates a mask on display 606 by selectively activating pixels 620-1 through 620-n. This mask directs pixels 611-1 through 611-n to the left eye 632 of user 630 and directs pixels 612-1 through 612-n to the right eye 631 of user 630. Presenting different images to the right eye 631 and left eye 632 of user 630 allows user 630 to perceive the image on display 605 in 3D.

Those skilled in the art may readily recognize other techniques may be used. Real-time performance may be improved by pre-calculating the solutions to each position of eyes 631 and 632 and then modifying displays 605 and 606 as a final processing step after the required image to be displayed is determined. Because of this flexibility in modifying the configuration of displays 605 and 606 in software, mechanical movement of the panels may not be required to produce the final 3D image. Additionally, the use of controller 603 allows for corrections to imperfections in the displays and compensation of the display's relative locations without rigorous manufacturing processing which may require displays to be aligned to submicron accuracy.

Additionally, those skilled in the art may readily recognize that controller 603 may not need to be a software system run by a processor within display system 601. For instance, the software and/or processor may be external to display system 601 or controller 603 may be integrated into the graphics processing unit.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Those skilled in the art will readily recognize that various other modifications, arrangements and methods can be made to the present invention without strictly following the exemplary applications illustrated and described herein and without departing from the spirit and scope of the present invention. It is therefore contemplated that the appended claims will cover any such, modifications or embodiments as fall within the true scope of the invention.

The invention claimed is:

1. A method of displaying an image, the method comprising the steps of:
   aligning a first display relative to a second display;
   the first display having a first color pixel encoding pattern and the second display having a second pixel color encoding pattern, wherein the first pixel color encoding pattern and the second pixel color encoding pattern are distinct;
   determining a first location and a second location;
   activating pixels on the first display to display a first image and a second image; and
   activating pixels on the second display based on the first location, the second location, the first image and the second image; wherein the first image is directed to the first location and the second image is directed to the second location.

2. The method of claim 1, wherein the first display has a first pixel spatial resolution and the second display has a second pixel spatial resolution, the first pixel spatial resolution and second pixel spatial resolution being distinct.

3. The method of claim 1, wherein the first pixel color encoding pattern is RGB, and the second pixel color encoding pattern is BGR.

4. The method of claim 1, further comprising the step of: using temporal color synthesis to achieve the first pixel color encoding pattern.

5. The method of claim 1, further comprising the step of: tracking at least one tracked location using a plurality of tracking devices; wherein the first location and the second location are based on the at least one tracked location.

6. The method of claim 5, wherein the step of tracking the at least one tracked location comprises: determining the location of a right eye and a left eye of the user.

7. The method of claim 1, further comprising the step of: using a laser light source.

8. The method of claim 1, further comprising the step of: filtering color crosstalk using a color crosstalk filter.

9. The method of claim 1 further comprising the step of: using a stroboscopic light source and relative display movement.

10. A method of displaying an image, the method comprising the steps of:
    aligning a first display relative to a second display;
    filtering color crosstalk using a color crosstalk filter;
    determining a first location and a second location;
    activating pixels on the first display to display a first image and a second image; and
    activating pixels on the second display based on the first location, the second location, the first image and the second image; wherein the first image is directed to the first location and the second image is directed to the second location.

11. An image display device for viewing a 3D image comprising:
    a control module;
    a tracking system communicatively coupled to the control module; and
    a first display and a second display communicatively coupled to the control module, the first display having a first pixel color encoding pattern and the second display having a second pixel color encoding pattern, wherein the first pixel color encoding pattern and second pixel color encoding pattern are distinct;

wherein the control module uses a location supplied by the tracking system to selectively activate pixels on each of the plurality of displays.

12. The image display device of claim 11, wherein the first display has a first pixel spatial resolution and the second display has a second pixel spatial resolution; and the first pixel spatial resolution and second pixel spatial resolution being distinct.

13. The image display device of claim 11, wherein the first pixel color encoding pattern being RGB, and the second pixel color encoding pattern being BGR.

14. The image display device of claim 11, wherein the displays use temporal color synthesis to achieve differing pixel color encoding patterns among at least two of the displays.

15. The image display device of claim 11, wherein the tracking system comprises a plurality of tracking devices, wherein the tracking devices comprise at least one of an IR Range Sensor and a camera.

16. The image display device of claim 11, wherein the image display device comprises a laser light source.

17. The image display device of claim 11, wherein the image display device comprises a plurality of color crosstalk filters.

18. The image display device of claim 11, wherein the image display device comprises a stroboscopic light source and adjustable displays.

19. An image display device for viewing a 3D image comprising:
    a first display and a second display, the first and second displays having different pixel color encoding patterns;
    means for tracking a location; and
    means for selectively activating pixels on the first display and the second display based on the location.

* * * * *